United States Patent
Keerthi

(10) Patent No.: US 7,492,828 B2
(45) Date of Patent: Feb. 17, 2009

(54) TIME SYNCHRONIZATION USING SPECTRAL ESTIMATION IN A COMMUNICATION SYSTEM

(75) Inventor: Arvind Vijay Keerthi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 360 days.

(21) Appl. No.: 11/021,694

(22) Filed: Dec. 22, 2004

(65) Prior Publication Data

US 2005/0282568 A1    Dec. 22, 2005

Related U.S. Application Data

(60) Provisional application No. 60/580,811, filed on Jun. 18, 2004.

(51) Int. Cl.
*H04L 27/06* (2006.01)
*H04L 27/28* (2006.01)

(52) U.S. Cl. ......................... 375/260; 375/340
(58) Field of Classification Search .................. 375/145, 375/260, 340, 354, 362, 364, 365, 366; 704/500
See application file for complete search history.

(56) References Cited

U.S. PATENT DOCUMENTS

| | | | | |
|---|---|---|---|---|
| 5,285,209 A * | 2/1994 | Sharpin et al. | ............... | 342/424 |
| 7,116,981 B2 | 10/2006 | Jeon et al. | | |
| 2002/0065664 A1* | 5/2002 | Witzgall et al. | ............ | 704/500 |
| 2003/0016773 A1* | 1/2003 | Atungsiri et al. | ............ | 375/355 |
| 2003/0114164 A1* | 6/2003 | Thomas et al. | ............. | 455/452 |
| 2004/0225437 A1* | 11/2004 | Endo et al. | ................. | 701/209 |

FOREIGN PATENT DOCUMENTS

| | | |
|---|---|---|
| EP | 0 940 942 A2 | 2/1999 |
| EP | 1124347 | 8/2001 |
| EP | 1 392 015 A1 | 1/2003 |
| FR | 2 830 389 A1 | 4/2003 |
| WO | WO 97/19542 | 5/1997 |
| WO | WO 01/56239 A2 | 8/2001 |

OTHER PUBLICATIONS

International Search Report PCT/US05/021053, International Search Authority European Patent Office, Jan. 26, 2006.

* cited by examiner

*Primary Examiner*—Don N Vo
(74) *Attorney, Agent, or Firm*—Sandip S. Minhas; Stanton Braden; Thomas R. Rouse

(57) ABSTRACT

To perform time synchronization using spectral estimation, a receiver obtains a frequency response estimate for pilot symbols received on each set of frequency subbands used for pilot transmission. The receiver performs spectral estimation on frequency response estimates for different sets of subbands to obtain a measured arrival time for a transmission from a transmitter. The spectral estimation determines a dominant frequency component in the frequency response estimates and derives the measured arrival time based on this dominant frequency component. A time error between the measured arrival time and a desired arrival time is computed and possibly filtered. The filtered or unfiltered time error is scaled with a fixed or adjustable gain. A time adjustment is then generated based on the scaled time error and using linear and/or non-linear functions. The time adjustment is sent to the transmitter and used to adjust the transmit timing at the transmitter.

53 Claims, 9 Drawing Sheets ns from base stations to user terminals. A user terminal may also transmit data to one or more base stations on the reverse link.

TIME SYNCHRONIZATION USING SPECTRAL ESTIMATION IN A COMMUNICATION SYSTEM

This application claims the benefit of provisional U.S. application Ser. No. 60/580,811, entitled "Time Synchronization Using Spectral Estimation," filed Jun. 18, 2004.

BACKGROUND

I. Field

The present invention relates generally to communication, and more specifically to time synchronization in a communication system.

II. Background

A multiple-access communication system can support communication for multiple user terminals by sharing the available system resources (e.g., time, frequency, and/or transmit power). Each user terminal communicates with one or more base stations via transmissions on the forward and reverse links. The forward link (or downlink) refers to the communication link from the base stations to the user terminals, and the reverse link (or uplink) refers to the communication link from the user terminals to the base stations.

On the reverse link, a base station may receive transmissions from multiple user terminals. The transmission from each user terminal travels via a different set of signal paths. The signal paths for different user terminals typically have different channel gains and propagation delays. Consequently, the transmissions from these user terminals may arrive at different times at the base station for the same transmission starting time. The transmissions may interfere with one another if they are not properly time aligned at the base station. This interference may adversely impact the base station's ability to recover the transmission from each user terminal and may degrade performance for all affected user terminals.

A time control loop may be used to adjust the timing of each user terminal so that its transmission arrives at the proper time at the base station. The design of the time control loop may be challenging due to various factors such as, for example, difficulty in obtaining an accurate measurement of the arrival time of a transmission. This difficulty may be due to the manner in which the transmission is sent, adverse channel conditions, and so on.

There is therefore a need in the art for techniques to accurately measure arrival time at a receiver and to properly adjust timing at a transmitter in a communication system.

SUMMARY

Techniques for performing time synchronization using spectral estimation are described herein. Time synchronization entails determining the time of arrival of a transmission (or a signal) at a receiver and adjusting the transmit timing at a transmitter such that the transmission arrives at a desired time at the receiver. The receiver typically does not know a priori the arrival time of the transmission because the transmitter may transmit starting at an arbitrary time instant and the wireless channel may introduce an unknown delay. The receiver can obtain a relatively accurate arrival time measurement for the transmission from the transmitter using spectral estimation.

In an embodiment for performing time synchronization using spectral estimation, the receiver obtains a frequency response estimate for pilot symbols received on each set of frequency subbands used for pilot transmission. The receiver may obtain different frequency response estimates for different sets of subbands. The receiver then performs spectral estimation on the frequency response estimates to obtain a measured arrival time for the transmission from the transmitter. The spectral estimation determines a dominant frequency component in the frequency response estimates and derives the measured arrival time based on this dominant frequency component, as described below. A time error between the measured arrival time and a desired arrival time is computed and may be filtered with a lowpass filter. The filtered or unfiltered time error is scaled with a gain, which may be fixed or adjustable based on one or more criteria. A time adjustment is then generated based on the scaled time error and using linear and/or non-linear functions. For example, the time adjustment may be limited (or saturated) to be within a predetermined range of values to account for possible inaccuracy in the arrival time measurement. The time adjustment is sent to the transmitter and used to adjust the transmit timing at the transmitter.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
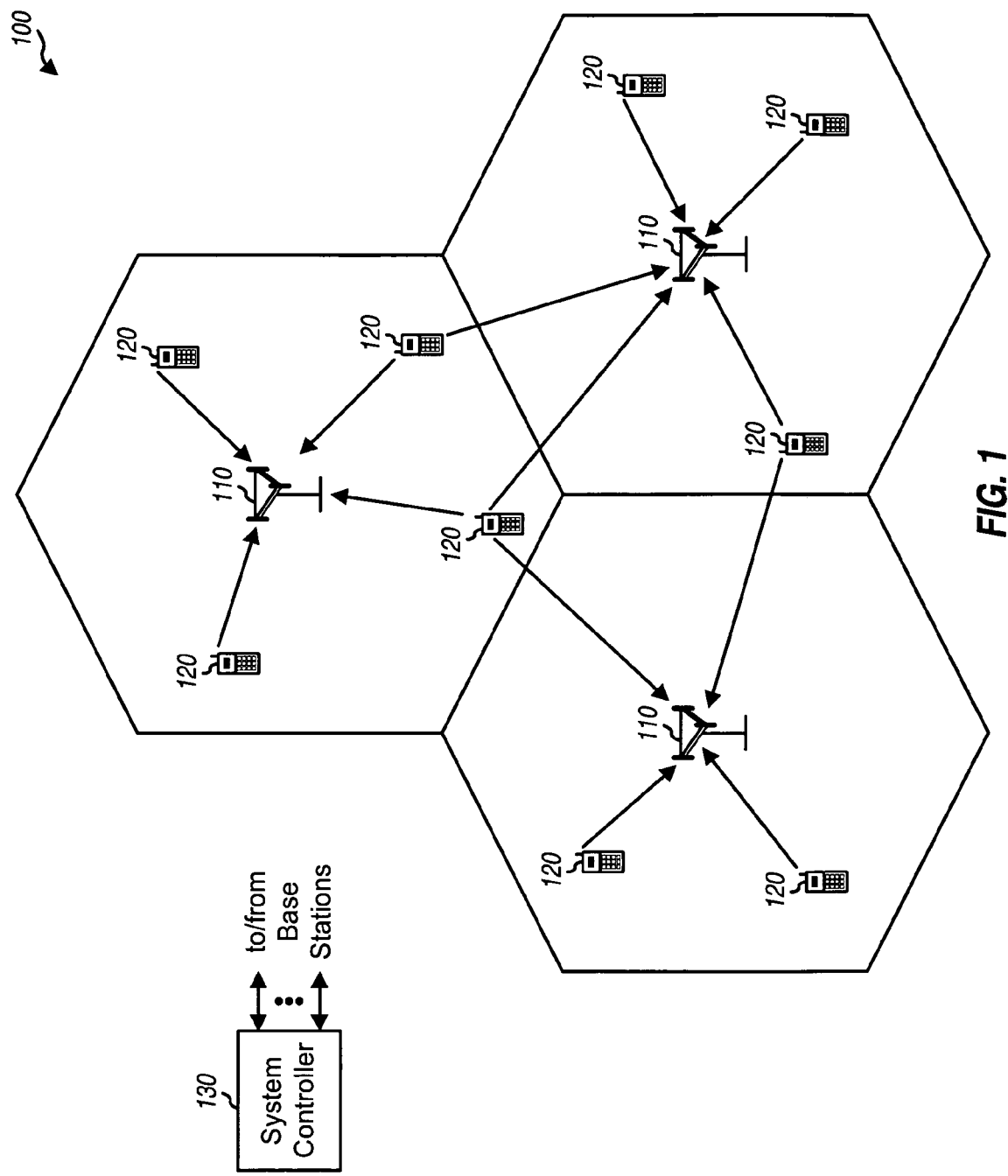
FIG. 1 shows a wireless multiple-access communication system.

FIG. 1 shows a wireless multiple-access communication system 100. System 100 includes a number of base stations 110 that support communication for a number of user terminals 120. A base station is typically a fixed station used for communicating with the user terminals and may also be called an access point, a Node B, or some other terminology. User terminals 120 are typically dispersed throughout the system, and each user terminal may be fixed or mobile. A user terminal may also be called a mobile station, a user equipment (UE), a wireless communication device, or some other terminology. Each user terminal may communicate with one or more base stations on the forward and reverse links at any given moment. For simplicity, FIG. 1 only shows transmissions on the reverse link. For a centralized system, a system controller 130 couples to the base stations and provides coordination and control for these base stations.

The time synchronization techniques described herein may be used for various wireless and wireline communication systems. For example, these techniques may be used for an orthogonal frequency division multiple access (OFDMA) system, a Time Division Multiple Access (TDMA) system, a Code Division Multiple Access (CDMA) system, a Frequency Division Multiple Access (FDMA) system, and so on. Other examples of such multiple-access systems include Multiple-Carrier CDMA (MC-CDMA), and Wideband CDMA (W-CDMA), High-Speed Downlink Packet Access (HSDPA). These techniques may also be used for the forward link to adjust the timing of the base stations and for the reverse link to adjust the timing of the user terminals. For clarity, these techniques are described below for the reverse link in a wireless OFDMA system.

An OFDMA system utilizes orthogonal frequency division multiplexing (OFDM). OFDM is a multi-carrier modulation technique that effectively partitions the overall system bandwidth into multiple (N) orthogonal frequency subbands. These subbands are also commonly called tones, subcarriers, bins, and frequency channels. Each subband is associated with a respective subcarrier that may be modulated with data. Up to N modulation symbols may be sent on the N total subbands in each OFDM symbol period. These modulation symbols are converted to the time-domain with an N-point inverse fast Fourier transform (IFFT) to generate a transformed symbol that contains N time-domain chips or samples. To combat inter-symbol interference (ISI), which is caused by frequency selective fading in a multipath channel, C chips of the transformed symbol are repeated to form an OFDM symbol that contains N+C chips, where C is typically a fraction of N. The C repeated chips are often called a cyclic prefix, and C is the cyclic prefix length. An OFDM symbol period is the duration of one OFDM symbol and is equal to N+C chip periods.

As shown in FIG. 1, multiple user terminals may transmit to each base station. The user terminals may be located throughout the system and may have different propagation delays to the base station. The propagation delay for each user terminal may also change over time due to movement by the user terminal, changes in the wireless channel, and so on. The timing of the transmission from each user terminal may be adjusted to account for the propagation delay observed by that user terminal. This ensures that the transmissions from different user terminals arrive time aligned at each base station and do not interfere with one another.

Figure 2:
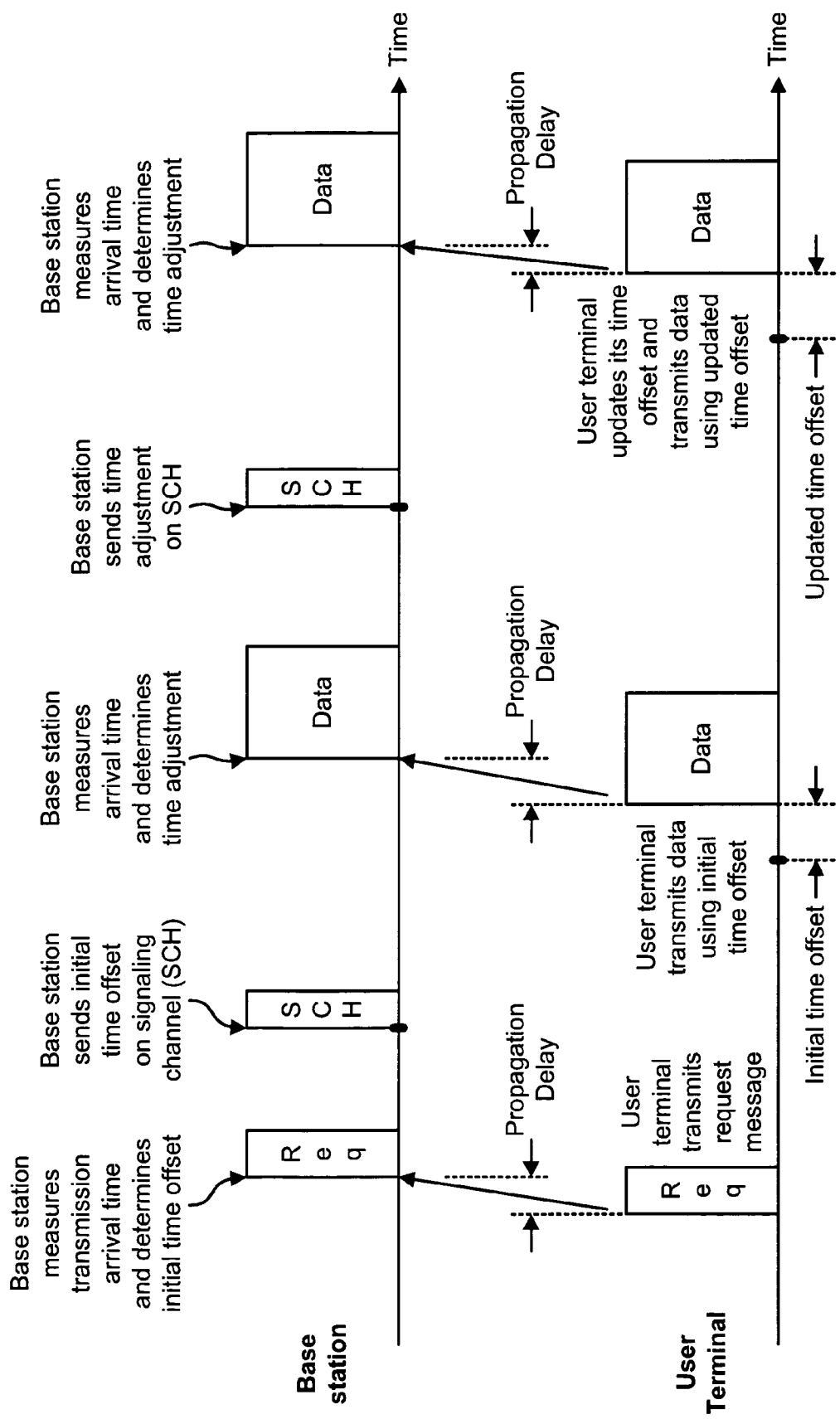
FIG. 2 shows a process for adjusting the timing of a user terminal for a data transmission to a base station.

FIG. 2 shows a process for adjusting the timing of a user terminal for a data transmission on the reverse link from the user terminal to a base station. Initially, the user terminal transmits a request message to the base station. This message may request access to the system, permission to transmit on the reverse link, and so on. This message may contain an indication of the starting time instant at which the message was sent, based on the transmit timing at the user terminal. The base station receives the request message and measures the arrival time of the transmission from the user terminal. The base station then determines an initial time offset, e.g., based on the transmission start time indicated by the request message and the arrival time measured by the base station. This initial time offset is the amount of adjustment to the transmit timing at the user terminal in order for the base station to receive the transmission from the user terminal at the proper time instant. The base station sends the initial time offset via a signaling channel (SCH). The user terminal receives the initial time offset, adjusts its transmit timing accordingly, and transmits data using the initial time offset.

The base station receives the data transmission from the user terminal and measures the arrival time of this transmission. The propagation delay for the user terminal may have changed since the last transmission. In this case, the arrival time of the data transmission may be different from the desired arrival time for the data transmission, which may be the start of a time interval that the base station has allocated to the user terminal. The base station computes the difference or error between the measured arrival time and the desired arrival time and determines a time adjustment for the user terminal. The base station then sends the time adjustment via the SCH. The user terminal receives the time adjustment, updates its transmit timing accordingly, and transmits data using the updated time offset.

The timing adjustment process typically continues through the entire data transmission from the user terminal. The base station measures the arrival time of each transmission received from the user terminal and determines the time adjustment. The user terminal updates its transmit timing for each timing adjustment received from the base station. The current transmit timing at the user terminal is determined by the initial time offset plus all time adjustments received from the base station. The user terminal uses the current transmit timing for transmission to the base station.

Figure 3:
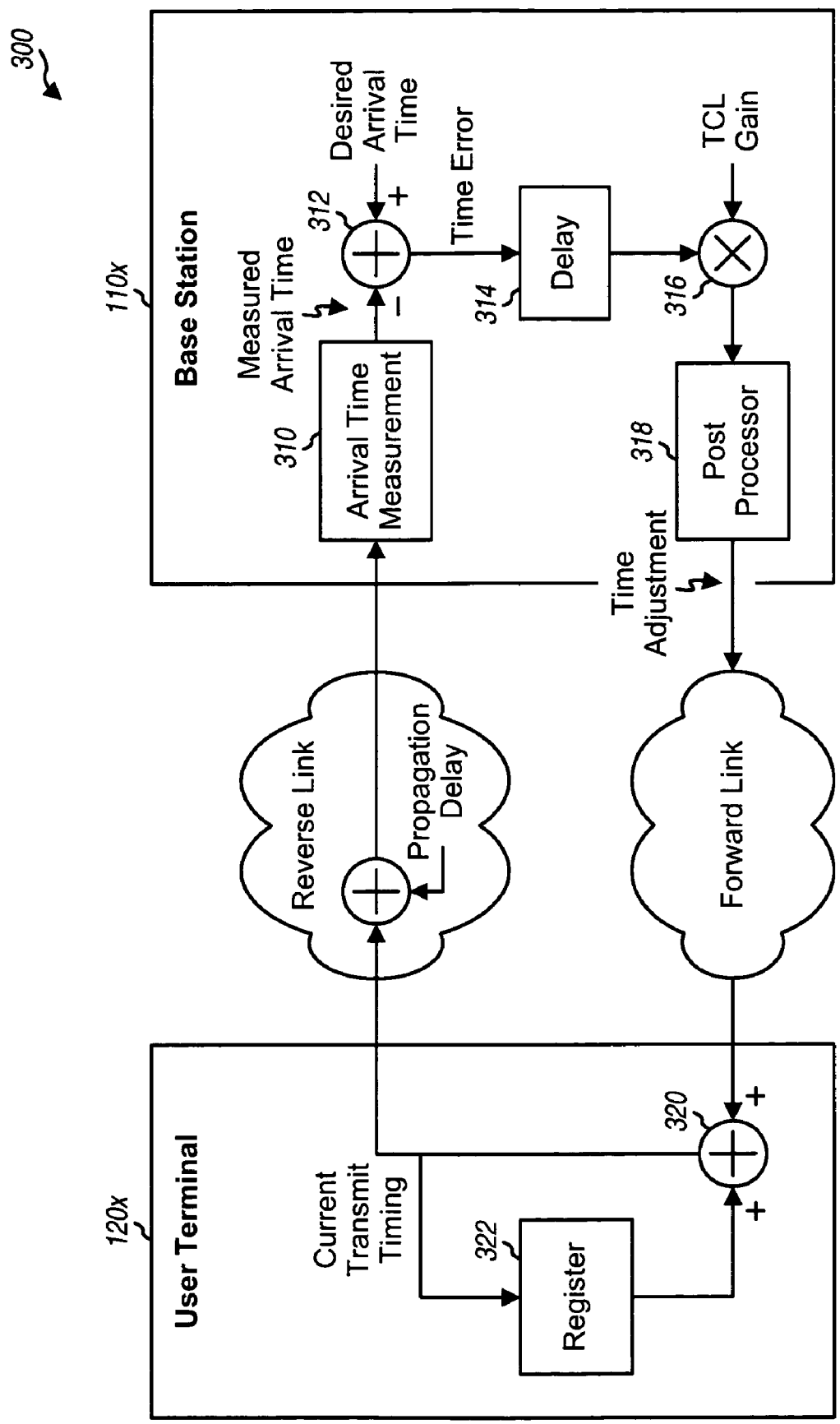
FIG. 3 shows a model of a time control loop (TCL).

FIG. 3 shows an exemplary model 300 of a time control loop (TCL) between a user terminal 120x and a base station 110x. The user terminal transmits on the reverse link using its current transmit timing. The transmission observes a propagation delay through the wireless channel and may also be distorted by multipath in the wireless channel. The propagation delay may change arbitrarily over time.

At the base station, an arrival time measurement unit 310 receives the transmission from the user terminal, measures the arrival time of the received transmission, and provides the measured arrival time. A summer 312 subtracts the measured arrival time from the desired arrival time and provides the time error for the received transmission. A delay unit 314 provides a delay of one update period for the time control loop. Delay unit 314 is included in model 300 to account for the delay in updating the time control loop. This updating delay is due to the fact that the arrival time measurement made in the current TCL update period is not reflected in the transmit timing at the user terminal until the next TCL update period. The TCL update rate, and hence the TCL update period, is determined by the rate at which time adjustments are sent by the base station to the user terminal. The TCL update rate may be fixed or variable depending on the system design.

A multiplier 316 multiplies the delayed time error from delay unit 314 with a TCL gain and provides a scaled time error. The TCL gain determines the loop characteristics of the time control loop, as described below. A post processor 318 quantizes the scaled time error, performs post processing (if any) on the quantized value, and provides a time adjustment for the received transmission. For example, post processor 318 may perform saturation and limit the time adjustment to be within a predetermined range of values. The time adjustment indicates whether the user terminal should advance or retard its transmit timing so that the transmission from the user terminal is received at the desired arrival time. The time adjustment may be given in predetermined units (e.g., eights of chips). The base station sends the time adjustment via the forward link to the user terminal.

At the user terminal, a summer 320 receives the time adjustment from the base station, sums this time adjustment with the prior transmit timing stored in a register 322, and provides the current transmit timing. The current transmit timing is stored in register 322 and is also used for the next transmission to the base station. Summer 320 and register 322 form an accumulator that updates the transmit timing at the user terminal based on the time adjustments received from the base station.

The processing for the initial time offset may be different from the processing for the time adjustment. For example, the time error for the first transmission received from the user terminal may be scaled by one (instead of the TCL gain) to obtain the initial time offset, and the post processing may be omitted. Summer 320 may sum the initial time offset with the prior transmit timing in the same manner as for the time adjustment.

FIG. 3 shows a first-order time control loop with one accumulator within the loop. Other time control loops may also be used to adjust the transmit timing at the user terminal to account for the propagation delay introduced by the wireless channel. For example, a second-order time control loop may also be used.

The arrival time of a transmission may be measured using various techniques. A suitable measurement technique may be selected based on various factors such as, for example, the manner in which data and pilot are transmitted in the system. A pilot is known data that is processed and transmitted in a known manner. A transmitter may transmit a pilot to assist a receiver perform various functions such as time synchronization, channel estimation, frequency correction, automatic gain control, and so on. Several exemplary transmission schemes for transmitting data and pilot are described below.

Figure 4A:
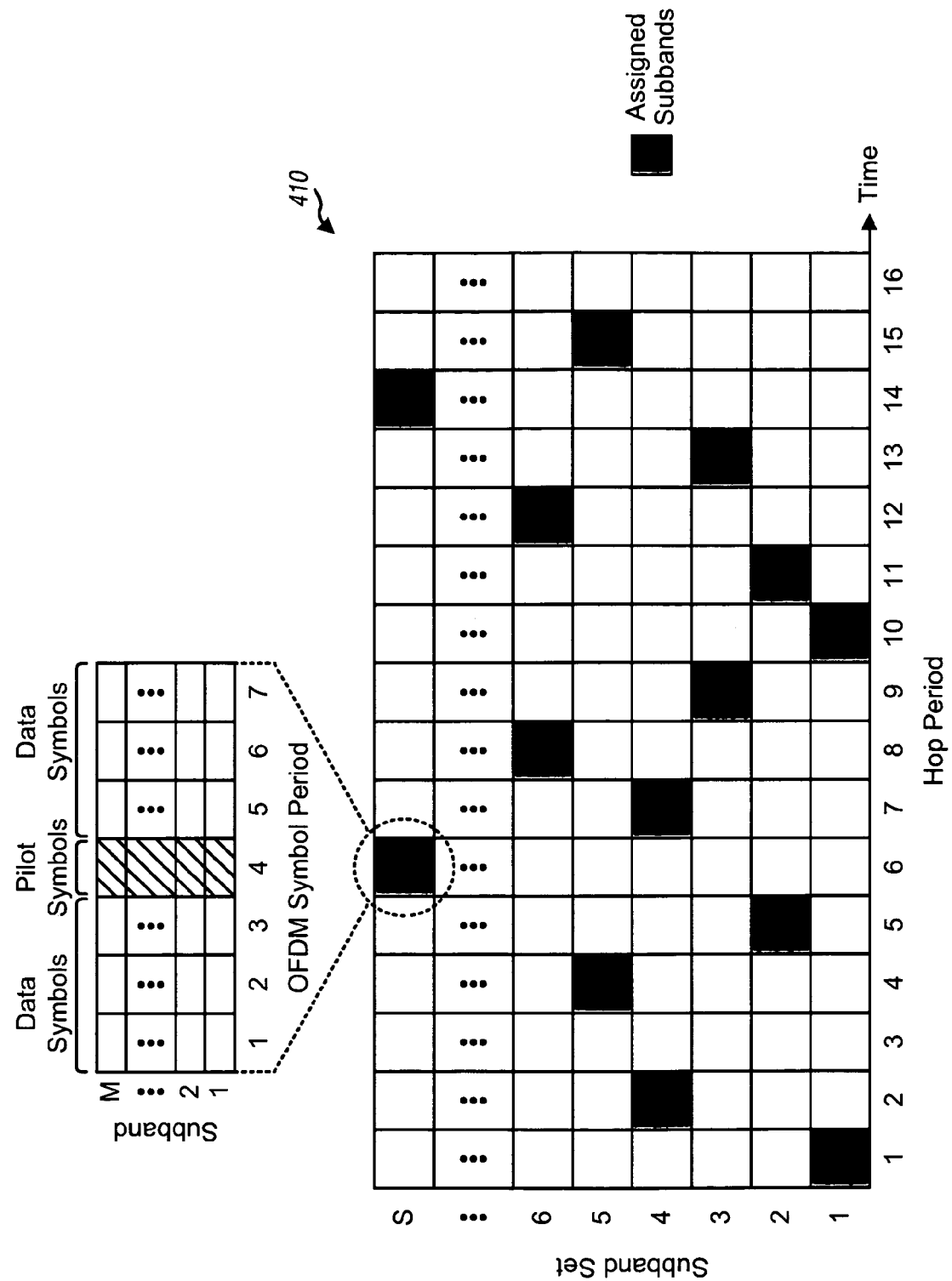
FIGS. 4A and 4B show two exemplary transmission schemes.

FIG. 4A shows a frequency hopping (FH) transmission scheme 410 that may be used for the OFDMA system. Frequency hopping can randomize interference and provide frequency diversity against deleterious path effects. With frequency hopping, each user terminal is assigned a different FH sequence that indicates the particular subband(s) to use in each hop period. Each hop period may span one or multiple OFDM symbol periods. Each FH sequence may pseudo-randomly select subbands to use for transmission. The FH sequences for different user terminals in communication with the same base station are orthogonal to one another so that no two user terminals use the same subband in any given hop period. This avoids "intra-cell" interference among the user terminals communicating with the same base station. The FH sequences for each base station are pseudo-random with respect to the FH sequences for nearby base stations. This randomizes "inter-cell" interference among the user terminals in communication with different base stations.

For the example shown in FIG. 4A, S sets of subbands are formed with the N total subbands, and each set contains M subbands, where N=M×S. M≧1, and S>1. The M subbands in each set may be contiguous (as shown in FIG. 4A) or non-contiguous. Each user terminal may be assigned one set of subbands in each hop period. Data symbols (which are modulation symbols for data) may be time division multiplexed (TDM) with pilot symbols (which are modulation symbols for pilot), as shown in FIG. 4A. Transmission scheme 410 may be used, for example, for the reverse link in the OFDMA system.

Figure 4B:
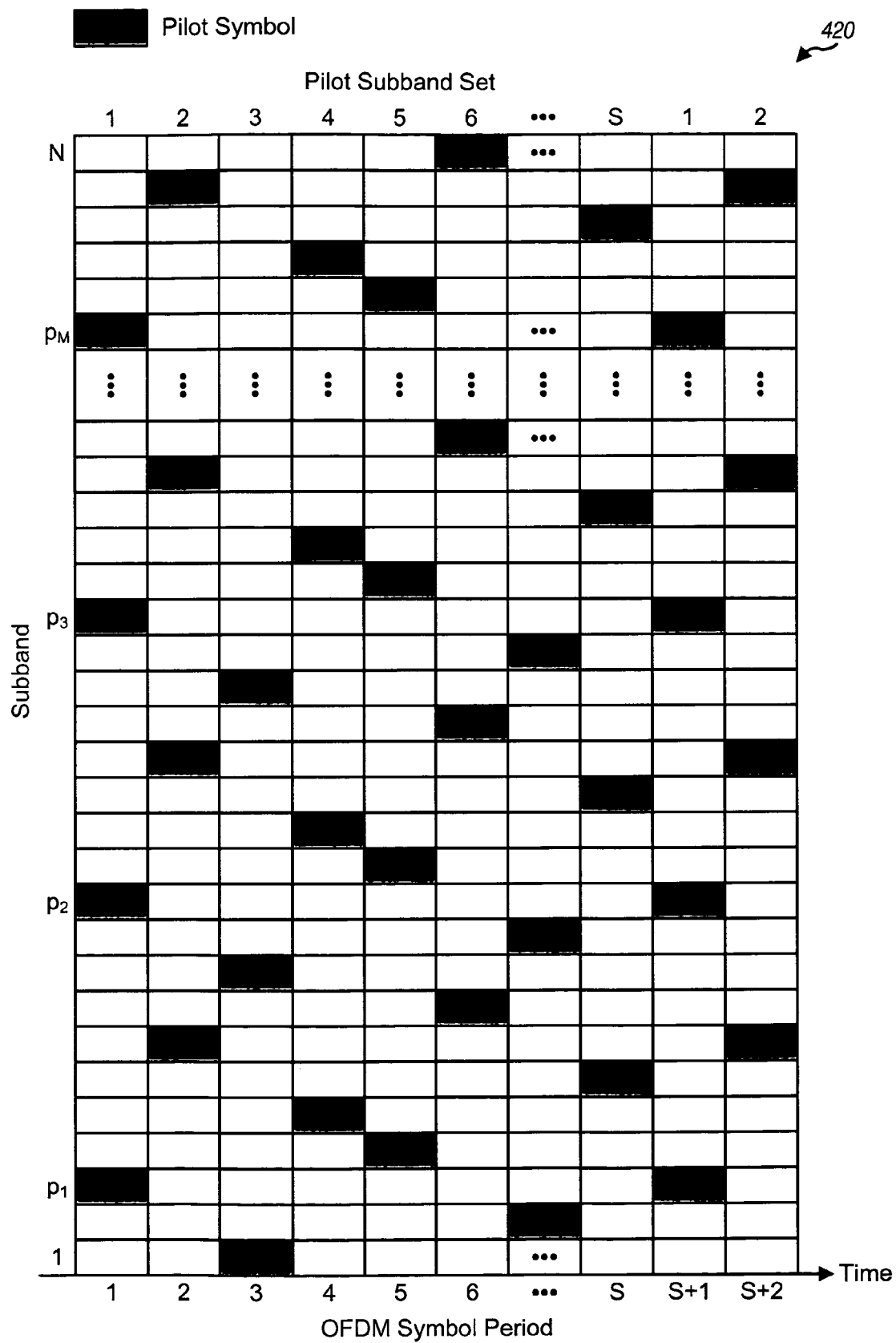

FIG. 4B shows an interlaced transmission scheme 420 that may also be used for the OFDMA system. For the example shown in FIG. 4B, S sets of subbands are formed, with each set containing M subbands. To provide frequency diversity, the M subbands in each set may be uniformly spaced apart by S subbands. The S subband sets are then interlaced with one another, as shown in FIG. 4B. In each OFDM symbol period, one set of subbands may be used for pilot transmission and the remaining S-1 sets of subbands may be used for data transmission. Different subband sets may be used for pilot transmission in different OFDM symbol periods. These subband sets may be selected in a pseudo-random manner (e.g., with a PN sequence) or a deterministic manner (e.g., with a predetermined sequence of length S, as shown in FIG. 4B). Transmission scheme 420 may be used, for example, for the forward link in the OFDMA system.

A transmission scheme that is a combination of the two schemes shown in FIGS. 4A and 4B may be used for the reverse link. For this transmission scheme, S interlaced subband sets are formed, e.g., as shown in FIG. 4B. However, each hop period spans multiple OFDM symbol periods, and data and pilot are time division multiplexed on each subband in each hop period, e.g., as shown in FIG. 4A.

In general, any number of subband sets may be formed, and each set may contain any number and any combination of subbands. The arrival time measurement and time synchronization may be performed in different manners depending on the particular scheme used for data and pilot transmission.

In an embodiment, time synchronization is performed using spectral estimation. Spectral estimation can provide relatively accurate arrival time measurements based on a narrowband pilot that is transmitted over only a portion of the overall system bandwidth at a time, e.g., on M subbands among the N total subbands as shown in FIG. 4A or 4B. Spectral estimation may also be used for a wideband pilot that is transmitted on all or a large percentage of the N total subbands, e.g., in a TDM manner with data.

A wireless channel in the OFDMA system may be characterized by either a channel impulse response or a corresponding channel frequency response. As used herein, and which is consistent with conventional terminology, a channel impulse response is a time-domain response of the wireless channel, and a channel frequency response is a frequency-domain response of the channel. In a sampled-data system, the channel frequency response is a discrete Fourier transform (DFT) of the channel impulse response. The channel impulse response is composed of a sequence of "channel taps", with each channel tap being defined by a channel tap gain (or simply, "tap gain") and a channel tap delay (or simply, "tap delay"). The channel frequency response is composed of a set of "channel gains", with each channel gain being for a specific subband.

The channel impulse response has L channel taps of interest, e.g., L channel taps of sufficient strength, where L≦N. Each channel tap has a complex gain of $h_i$ and is located at a delay of $d_i$. In general, each channel tap may be located anywhere between 1 and N (or $1 \leq d_i \leq N$), where N is also the time span or length of the wireless channel. The L tap gains are denoted as $\{h_i\}$, or $h_i$ for i=1, 2, ... L. The L tap delays are denoted as $\{d_i\}$, or $d_i$ for i=1, 2, ... L. The tap gains $\{h_i\}$ are correlated random variables that vary at a rate determined by the Doppler spread of the wireless channel. The L tap gains $\{h_i\}$ as well as the L tap delays $\{d_i\}$ are unknown and may be estimated as described below.

The channel impulse response may be represented in the z-domain by an L-tap finite impulse response (FIR) filter, H(z), as follows:

$$H(z) = \sum_{i=1}^{L} h_i \cdot z^{-d_i}, \qquad \text{Eq (1)}$$

where $z^{-1}$ denotes a delay of one chip period and $z^{-d_i}$ denotes the delay of the i-th channel tap. The channel impulse response may also be represented by an L×1 vector $\underline{h}$, without explicit reference to tap delays $\{d_i\}$, as follows:

$$\underline{h} = [h_1 h_2 \ldots h_L]^T, \qquad \text{Eq (2)}$$

where "$T$" denotes a transpose.

A channel profile may be defined as follows:

$$\underline{P} = \text{diag}\langle \underline{h} \cdot \underline{h}^T \rangle, \qquad \text{Eq (3)}$$

where $\langle \rangle$ denotes a time-averaging operation;

diag $\{\underline{M}\}$ is a diagonal matrix with just the diagonal elements of a matrix $\underline{M}$; and $\underline{P}$ is an L×L diagonal matrix for the channel profile.

A diagonal matrix contains possible non-zero values along the diagonal and zeros elsewhere. The diagonal elements of $\underline{P}$ represent a channel profile defined by $\underline{h}$. The channel profile is indicative of the long-term time-averaged energy of the channel taps in the channel impulse response. The channel profile does not include short-term effects such as fading, Doppler, and so on. The channel profile is thus indicative of the reflectivity/transmissivity of a medium via which a signal may travel.

A frequency-domain channel gain may be estimated for each subband used for pilot transmission, as follows:

$$H_k = \frac{y_k}{p_k}, \text{ for } k = 1, 2, \ldots M, \qquad \text{Eq (4)}$$

where $y_k$ is a received pilot symbol for subband k;

$p_k$ is a pilot symbol transmitted on subband k; and $H_k$ is a channel gain estimate for subband k.

For simplicity, equation (4) assumes that M consecutive subbands are used for pilot transmission, e.g., as shown in FIG. 4A, so that the subband index k runs from 1 through M. In general, any subbands may be used for pilot transmission, and these subbands are known by the receiver.

M channel gains $\{H_k\}$ for M subbands used for pilot transmission may be estimated based on pilot symbols received on these subbands, as shown in equation (4). The channel gains are frequency-domain values. Each channel gain may be expressed as a Fourier transform of the L (unknown) time-domain channel taps, as follows:

$$H_k = \sum_{i=1}^{L} (h_i \cdot e^{j2\pi \cdot d_i (k-1)/N} + n_i) = \sum_{i=1}^{L} (h_i \cdot e^{j\omega_i (k-1)} + n_i), \qquad \text{Eq (5)}$$

$$\text{for } k = 1, 2, \ldots M,$$

where $\omega_i = 2\pi d_i/N$ is an angular frequency (in radians) for the i-th channel tap; and $n_i$ is the noise for the i-th channel tap.

The factor "k-1" (instead of just "k") in the exponents in equation (5) is due to a subband index that starts with 1 instead of 0. The angular frequencies, $\omega_i$ for i=1, 2, ... L, are frequency components of the channel gains $\{H_k\}$ and are directly related to the unknown tap delays for the channel impulse response. The tap delays may thus be estimated by performing spectral estimation on the channel gains $\{H_k\}$, as described below.

Equation (5) may be expressed in matrix form, as follows:

$$\underline{H} = \begin{bmatrix} H_1 \\ H_2 \\ H_3 \\ \vdots \\ H_M \end{bmatrix} = \qquad \text{Eq (6)}$$

$$\begin{bmatrix} 1 & 1 & \cdots & 1 \\ e^{j\omega_1} & e^{j\omega_2} & \cdots & e^{j\omega_L} \\ e^{j2\omega_1} & e^{j2\omega_2} & \cdots & e^{j\omega_L} \\ \vdots & \vdots & \ddots & \vdots \\ e^{j(M-1)\omega_1} & e^{j(M-1)\omega_2} & \cdots & e^{j(M-1)\omega_L} \end{bmatrix} \cdot \begin{bmatrix} h_1 \\ h_2 \\ h_3 \\ \vdots \\ h_L \end{bmatrix} + \begin{bmatrix} n_1 \\ n_2 \\ n_3 \\ \vdots \\ n_L \end{bmatrix}, \text{ or}$$

$$\underline{H} = \underline{Q}\underline{h} + \underline{n}, \qquad \text{Eq (7)}$$

where $\underline{H}$ is an M×1 vector containing the channel gain estimates for the M subbands;

$\underline{Q}$ is an M×L "Fourier-type" matrix containing the elements shown in equation (6); and $\underline{n}$ is an L×1 noise vector.

The pilot may be transmitted on different sets of M subbands in different time intervals, e.g., as shown in FIG. 4A or 4B. For the transmission scheme shown in FIG. 4A, the pilot may be sent on subbands k=1, 2, ... M in one time interval, then subbands k=1+b, 2+b, ... M+b in the next time interval, and so on, where b may be any arbitrary offset value that is determined by the FH sequence. The channel gains for the pilot sent on subbands k=1+b, 2+b, ... M+b may be expressed as:

$$\underline{H}_b = \underline{Q} \cdot \underline{B} \cdot \underline{h} + \underline{n}, \qquad \text{Eq (8)}$$

where $\underline{B}$ is an L×L diagonal matrix given by $\underline{B} = \text{diag}(e^{jb\omega_1}, e^{jb\omega_2}, \ldots e^{jb\omega_L})$.

An M×M correlation (or outer product) matrix of $\underline{H}$ may be defined as $\underline{H} \cdot \underline{H}^H$, where "$H$" denotes a conjugate transpose. A long-term time-average of the correlation matrix of $\underline{H}$, denoted as $\underline{R}$, may be expressed as:

$$\underline{R} = \langle \underline{H} \cdot \underline{H}^H \rangle = \underline{Q} \cdot \underline{P} \cdot \underline{Q}^H + \sigma^2 \cdot \underline{I}, \qquad \text{Eq (9)}$$

where $\underline{I}$ is an identity matrix with ones along the diagonal and zeros elsewhere; and $\sigma^2$ is the variance of the noise.

Equation (9) is obtained based on equations (3), (7), and (8). Different b offset values may be selected (e.g., in a pseudo-random manner as shown in FIG. 4A or a deterministic manner as shown in FIG. 4B) such that the $\underline{B}$ matrices for an ensemble of different offset values averages to zero. In this case, if a sufficient amount of averaging is performed on the correlation matrices obtained for different time intervals, then the $\underline{B}$ matrices cancel out and do not appear in $\underline{R}$. Equation (9) also assumes that the channel noise is additive white Gaussian noise (AWGN) with zero mean, a variance of $\sigma^2$, and an autocovariance matrix of $\underline{\phi}_{nn} = \sigma^2 \cdot \underline{I}$.

Eigenvalue decomposition may be performed on the matrix $\underline{R}$ as follows:

$$\underline{R} = \underline{V} \cdot \underline{D} \cdot \underline{V}^H, \qquad \text{Eq (10)}$$

where $\underline{V}$ is an M×M unitary matrix of eigenvectors of $\underline{R}$; and $\underline{D}$ is an M×M diagonal matrix of eigenvalues of $\underline{R}$.

A unitary matrix $\underline{M}$ is characterized by the property $\underline{M}^H\underline{M}=\underline{I}$. The columns of a unitary matrix are orthogonal to one another, and each column has unit power. Eigenvalue decomposition is described by Gilbert Strang in a book entitled "Linear Algebra and Its Applications," Second Edition, Academic Press, 1980.

The M diagonal elements of $\underline{D}$ are referred to as eigenvalues of $\underline{R}$. The M columns of $\underline{V}$ are referred to as eigenvectors of $\underline{R}$. Each column of $\underline{V}$ corresponds to one eigenvalue in $\underline{D}$. Thus, the first or leftmost column of $\underline{V}$ corresponds to the diagonal element in the first column of $\underline{D}$, the second column of $\underline{V}$ corresponds to the diagonal element in the second column of $\underline{D}$, and so on.

The M eigenvalues in $\underline{D}$ may be ordered from smallest to largest and denoted as $\{\lambda_1, \lambda_2, \ldots \lambda_M\}$ after the ordering, where $\lambda_1$ is the smallest eigenvalue and $\lambda_M$ is the largest eigenvalue. When the eigenvalues in $\underline{D}$ are ordered, the eigenvectors in $\underline{V}$ are ordered correspondingly. If M>L, then the M-L smallest eigenvalues in $\underline{D}$ (i.e., $\lambda_1$ through $\lambda_{M-L}$) are equal to the noise variance $\sigma^2$ and are referred to as "noise" eigenvalues. The M-L eigenvectors in $\underline{V}$ corresponding to the M-L noise eigenvalues (i.e., the M-L leftmost columns of $\underline{V}$ after the ordering) are referred to as "noise" eigenvectors of $\underline{R}$ and are denoted as $\{\underline{v}_1, \underline{v}_2, \ldots \underline{v}_{M-L}\}$. The noise eigenvectors are orthogonal to the columns of $\underline{Q}$.

The L tap gains/power are contained in the matrix $\underline{P}$ and the L tap delays are contained in the matrix $\underline{Q}$. Each of the L columns of $\underline{Q}$ has the following form:

$$\underline{q}_l = [1, e^{j2\pi(l-1)/N}, e^{j2\pi(l-1)/N}, e^{j2\pi(M-1)(l-1)/N}], \qquad \text{Eq (11)}$$

where l is an index representing an unknown tap delay and is within a range of 1 through N, or $l \in \{1, 2, \ldots N\}$.

A cost function may be defined as follows:

$$C(l) = \frac{1}{\sum_{k=1}^{M-L} |\underline{q}_l^H \cdot \underline{v}_k|^2}, \text{ for } l = 1, 2, \ldots N. \qquad \text{Eq (12)}$$

The L unknown tap delays may be obtained based on the cost function C(l), as follows. The cost function is evaluated for each of the N possible values of l, i.e., for l=1, 2, . . . N. Each value of l represents a hypothesized delay value for a channel tap. For each value of l, the vector $\underline{q}_l$ is first determined as shown in equation (11) and multiplied with each of the M-L noise eigenvectors to obtain M-L inner products, $g_k = \underline{q}_l^H \cdot \underline{v}_k$ for k=1, 2, . . . M-L. The power of each inner product is then computed as $|g_k|^2 = g_k \cdot g_k^*$, where "*" denotes a complex conjugate. The powers of the M-L inner products are then summed, and the inverse of the summed power is provided as a cost value $C_l$ for this value of l. N cost values, $C_l$ for l=1, 2, . . . N, are obtained for N possible values of l.

Since the columns of $\underline{Q}$ are orthogonal to the noise eigenvectors, the inner product of any column of $\underline{Q}$ with any noise eigenvector is small or zero. Consequently, the summed power of the M-L inner products for each column of $\underline{Q}$ is small, and the inverse of this summed power is large. The L largest values among the N cost values are then identified. The L values of l corresponding to these L largest cost values represent the L unknown tap delays for the channel impulse response. These L identified values of l are used to form the matrix $\underline{Q}$ and are also used along with the known b offset value to form the matrix $\underline{B}$. The L tap gains may then be derived as follows:

$$\underline{h}_b = \underline{B}^{-1} \cdot \underline{Q}^{-1} \cdot \underline{H}_b, \qquad \text{Eq (13)}$$

where $\underline{H}_b$ is an M×1 vector for the frequency response estimate for one set of M pilot subbands; and $\underline{h}_b$ is an L×1 vector for a channel impulse response estimate with L taps.

An impulse response estimate $\underline{h}_b$ may be computed for the frequency response estimate $\underline{H}_b$, which is obtained from a pilot transmission received on one set of subbands. The impulse response estimates for different sets of subbands may be averaged to obtain an averaged impulse response estimate with L taps.

In the description above, L denotes the number of channel taps to be estimated, where $L \leq M$. In general, L may or may not be equal to the number of channel taps ($L_{act}$) in the actual impulse response of the wireless channel. If $L = L_{act} < M$, then the $L_{act}$ channel taps may be estimated as described above. If $L \neq L_{act}$ and L<M, then L channel taps representative of the channel profile for the wireless channel may be obtained as described above. In general, as M increases, more channel taps with good accuracy and high resolution may be estimated. For a wideband pilot with M being equal to or approaching N, a full channel impulse response with up to N taps may be estimated based on the wideband pilot.

To measure the arrival time of a transmission received via a wireless channel, the spectral estimation technique shown in equations (1) through (12) may be performed with L set equal to one. If L=1, then the spectral estimation technique provides a single channel tap situated at the center of the channel profile, assuming that M is greater than one. The tap delay corresponding to this single channel tap may be used as the measured arrival time for the transmission.

A computer simulation for arrival time measurement using spectral estimation for an exemplary wireless channel in an exemplary OFDMA system was performed. This OFDMA system has an overall system bandwidth of 5 MHz and uses an OFDM structure with 1024 total subbands (N=1024), 16 subbands in each set (M=16), and a cyclic prefix length of 48 chips (C=48). Each OFDM symbol period is 214.4 μsec, or (1024+48)/(5×10⁶). Each hop period spans seven OFDM symbol periods or 1.5 msec. One pilot symbol is sent in the middle of each hop period as shown in FIG. 4A.

The wireless channel has a channel profile that is 38 chips long, or $\{d_i\} = \{1, 2, \ldots 38\}$, which is approximately 80% of the cyclic prefix length. The channel profile is modeled with a different sequence of random values for each TCL update period. The channel profile changes in a random manner from one TCL update period to the next so that the sequence of random values for the channel profile for the current TCL update period is uncorrelated with the sequence of random values for a prior TCL update period. The channel noise is AWGN noise, and the signal-to-noise ratio (SNR) for the received pilot is 0 decibel (dB).

An arrival time measurement is made in each TCL update period so that the measurement rate is the same as the TCL update rate. The TCL update period is 90 msec, and each arrival time measurement is based on pilot symbols received in 60 hop periods. A channel frequency response vector $\underline{H}_b$ is obtained for each hop period based on the pilot symbols received in that hop period. The matrix $\underline{R}$ is updated in each hop period based on the vector $\underline{H}_b$. The arrival time is computed after 60 hop periods by performing equations (10) through (12) with L=1.

Figure 5:
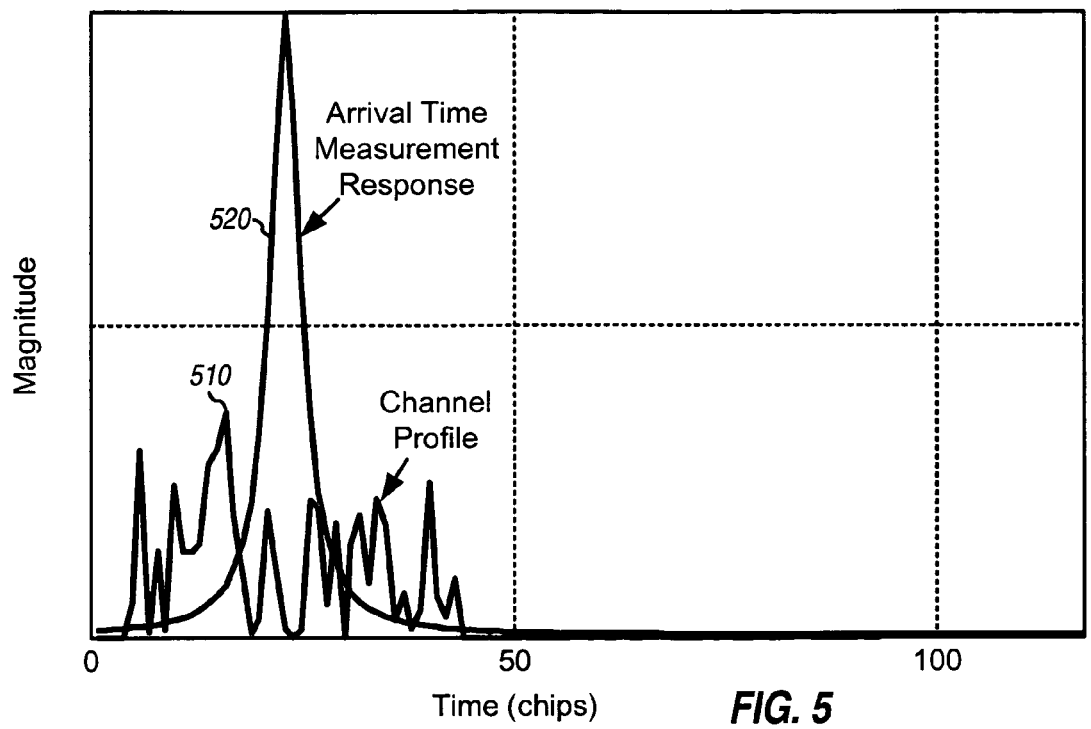
FIG. 5 shows a channel profile and an arrival time measurement response.

FIG. 5 shows a plot 510 of the channel taps for the wireless channel in one TCL update period. The 38 channel taps are randomly selected for the TCL update period. FIG. 5 also shows a plot 520 of an arrival time measurement response provided by the spectral estimation technique. The peak of plot 520 is the center of the channel profile, as estimated by the spectral estimation technique. FIG. 5 shows that the spectral estimation technique can determine the center of the channel profile even if the number of channel taps exceeds the number of subbands used for pilot transmission in each hop period. The time instant corresponding to the center of the channel profile is provided as the measured arrival time.

Referring back to FIG. 3, the time error from summer 312 is scaled by the TCL gain by multiplier 316. The TCL gain determines the loop bandwidth and the damping factor of the time control loop, which in turn determines the transient response of the time control loop. In general, a larger TCL gain corresponds to a wider loop bandwidth and a faster response time but more timing jitter for a noisy wireless channel. Conversely, a smaller TCL gain corresponds to a narrower loop bandwidth and a slower response time but less timing jitter for a noisy wireless channel.

The performance of the time control loop is simulated for the exemplary OFDMA system and exemplary wireless channel described above for FIG. 5. For the simulation, the initial arrival time for the received transmission is at 0 chip offset and the desired arrival time is −15 chip offset. The arrival time is measured every TCL update period (which is every 60 hop periods or 90 msec), and the time control loop is also updated in every TCL update period.

Figure 6:
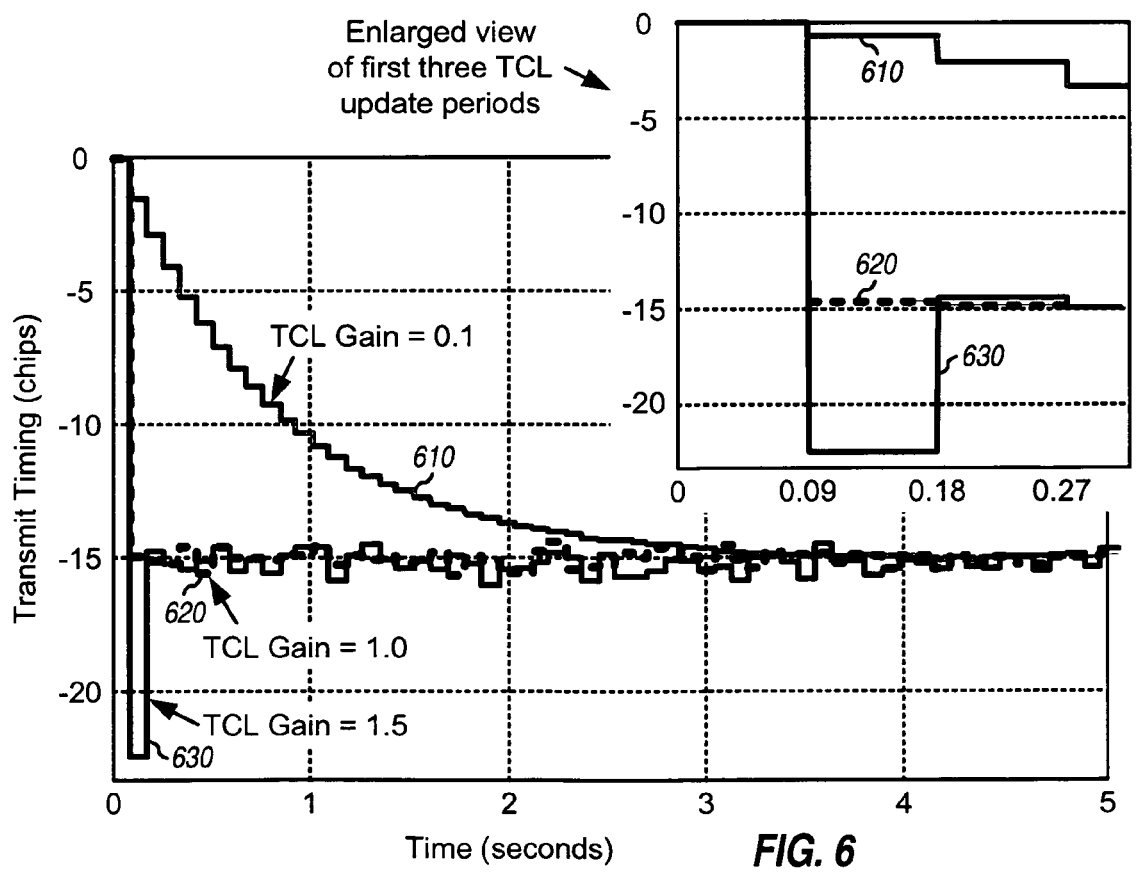
FIG. 6 shows step responses of the time control loop for different TCL gains.

FIG. 6 shows plots of the response of the time control loop for a step input with different TCL gains. Plots 610, 620 and 630 show the step responses of the time control loop with TCL gains of 0.1, 1.0 and 1.5, respectively. Plot 610 shows a step response having a settling time of approximately 3 seconds, which may be too slow. Plot 630 shows a step response having 8 chips of overshoot and ringing, which may be undesirable. Plot 620 shows a step response having fast settling to the desired arrival time and no overshoot. Although not shown in FIG. 6, a step response with a time constant of approximately 200 msec and less noise may be achieved with a TCL gain of 0.5. The step responses shown in FIG. 6 are obtained without saturation by post processor 318 in FIG. 3.

As shown in FIG. 6, the TCL gain affects the loop characteristics, which determine the response time as well as the noise performance of the time control loop. The TCL gain may be a fixed value that is selected based on a tradeoff between these two performance criteria. The TCL gain may also be a configurable value that is selected based on channel conditions. For example, a high TCL gain may be used for high SNR to improve tracking performance, and a low TCL gain may be used for low SNR to improve noise performance. The SNR may be estimated based on the received pilot. A high TCL gain may also be used for a high rate of shift in the channel profile, and a low TCL gain may be used for a low rate of shift in the channel profile. The rate of shift in the channel profile may be estimated based on the measured arrival time. For example, a high rate of shift may be deduced if multiple time errors (or a high percentage of time errors) are for the same direction. A high TCL gain may also be used for low variance in the arrival time measurements, which may indicate a relatively static or stationary channel for a fixed or low mobility user terminal. Conversely, a low TCL gain may be used for high variance in the arrival time measurements, which may indicate a rapidly changing channel for a high mobility user terminal. The rate of shift of the channel profile may be ascertained and used to adjust the TCL gain as well as to deduce certain characteristics (e.g., speed) of the wireless channel.

The TCL gain may also be configurable based on operating modes. For example, a high TCL gain may be used during an acquisition phase and a low TCL gain may be used during a tracking phase. The acquisition phase may span the first few TCL update periods, and the tracking phase may span the remaining TCL update periods.

The spectral estimation technique generally provides accurate arrival time measurements but may occasionally produce arrival time estimates that are inaccurate by a large amount. The maximum rate that the channel profile may shift is typically constrained by the speed of the user terminal. For example, the spectral estimation technique may produce arrival time estimates that are inaccurate by several chips (e.g., by ±4 chips for the scenario simulated). The maximum rate of shift in the channel profile may be a fraction of a chip (e.g., 0.1 chip) for each TCL update period. If the spectral estimation technique produces an arrival time measurement that is different from a preceding arrival time measurement by a large amount, then there is a high likelihood of measurement inaccuracy. In this case, the current arrival time measurement may be given less weight in updating the time control loop. Less weight may be achieved in various manners.

In one embodiment, the scaled time error from multiplier 316 in FIG. 3 is saturated by post processor 318 to be within a predetermined range of values. This range may be selected based on the maximum rate of shift in the channel profile. For example, if the maximum rate of shift is 0.1 chip per TCL update period, then the time adjustment may be limited to a range of +1 chip to −1 chip. This saturation reduces the amount of timing jitter due to inaccurate arrival time estimates.

In another embodiment, post processor 318 provides a large time adjustment if multiple large time errors are obtained. Post processor 318 may limit the time adjustment for the first large time error, as described above. Post processor 318 may provide a large time adjustment if the subsequent time error is also large, which may confirm the accuracy of the prior arrival time measurement. This "wait-and-confirm" scheme may allow for a faster loop response while eliminating many large arrival time measurement errors.

In yet another embodiment, delay unit 314 is replaced with a lowpass filter that filters the time errors from summer 312. The bandwidth of this lowpass filter is sufficiently wide so that the filter response does not adversely alter the closed loop characteristics of the time control loop.

In yet another embodiment, post processor 318 derives the time adjustment based on (1) a first (e.g., linear) function of the time error if the magnitude of the time error is within a predetermined range and (2) a second (e.g., non-linear) function of the time error if the magnitude is outside of the predetermined range. The non-linear function may be clipping or saturation, the wait-and-confirm scheme described above, or some other function.

The above description assumes that the time adjustments sent by the base station are correctly received by the user terminal. Depending on how the time adjustments are sent, there may be errors in the received time adjustments. The time control loop may be designed to account for these errors. For example, the timing adjustments may be sent more frequently and/or with higher transmit power in order to reduce error rate.

Figure 7:
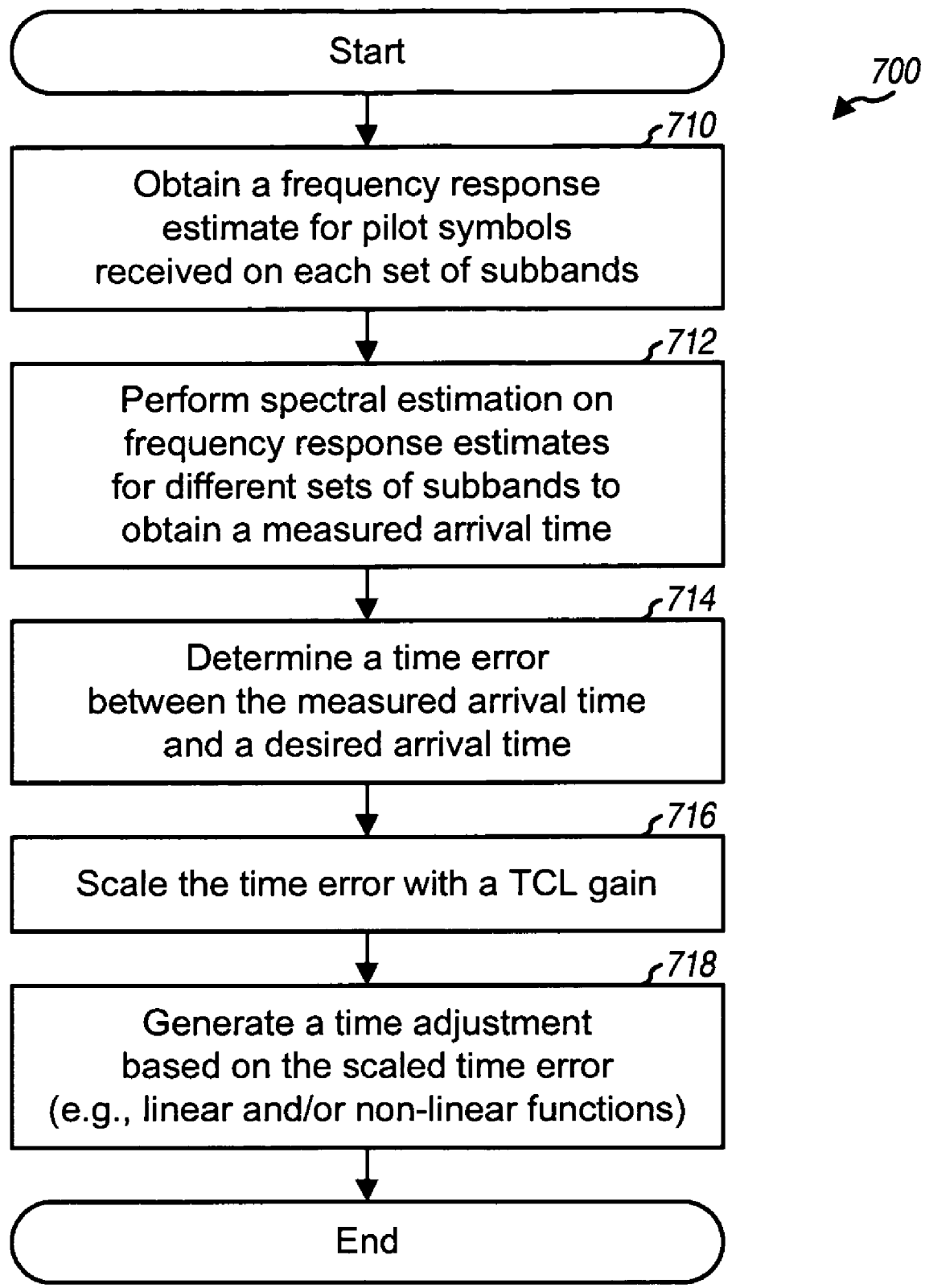
FIG. 7 shows a process for performing time synchronization using spectral estimation.

FIG. 7 shows a process 700 for performing time synchronization using spectral estimation. A frequency response estimate is obtained for pilot symbols received on each set of subbands (block 710). Different frequency response estimates may be obtained for different sets of subbands. Spectral estimation is then performed on the frequency response estimates to obtain a measured arrival time (block 712). The spectral estimation determines a dominant frequency component in the frequency response estimates and derives the measured arrival time based on this dominant frequency component.

A time error between the measured arrival time and a desired arrival time is determined (block 714). The time error may be filtered with a lowpass filter. The filtered or unfiltered time error is scaled with the TCL gain, which may be a fixed value or an adjustable value that is determined based on channel conditions and/or the selected operating mode (block 716). A time adjustment is then generated based on the scaled time error (block 718). The time adjustment may be limited to be within a predetermined range of values or generated based on linear and/or non-linear functions to account for measurement inaccuracy.

In the description above, the arrival time measurement is based on recognition that the unknown tap delays ($d_i$ for i=1, 2, ... L) to be ascertained are unknown frequency components ($\omega_i$ for i=1, 2, ... L) of the frequency-domain channel gains obtained from the received pilot symbols. Spectral estimation (or spectral analysis) is then performed to determine the unknown frequency components of the channel gains. These frequency components, once determined, serve as estimates of the unknown tap delays for a channel impulse response estimate. For arrival time measurement, the spectral estimation technique provides the dominant frequency component of the channel gains, which is then used to derive the measured arrival time.

The spectral estimation technique can provide accurate arrival time measurements for both (1) a narrowband pilot that is sent on only a small fraction of the system bandwidth at a time and (2) a wideband pilot that is sent on all or a large fraction of the system bandwidth. For a narrowband pilot, only a small portion of the system bandwidth is observable at any given time. The resolution to which the arrival time of a transmission can be determined is limited by the bandwidth of the channel observations. For example, if the pilot is sent on only M subbands at a time, where M may be much less than N, then a receiver can only observe the wireless channel over a relatively narrow band based on the pilot received on these M subbands. Consequently, a coarse arrival time measurement with a time resolution of $T_{ofdm}/M$ may be obtained based on a narrowband pilot received on any one set of M subbands, where $T_{ofdm}$ is the duration of an OFDM symbol without a cyclic prefix. The spectral estimation technique can provide a more accurate arrival time measurement with a time resolution of $T_{ofdm}/N$. As illustrated by the example above, $T_{ofdm}/N$ may be much finer than the $T_{ofdm}/M$ time resolution obtained with any one narrowband pilot transmission if M is much less than N. Accurate arrival time measurement is important for time synchronization to avoid or minimize interference among multiple transmitters and also for receiver processing to capture as much energy in each received OFDM symbol as possible.

For clarity, a specific spectral estimation technique, which is often referred to as a multiple signal classification (MUSIC) technique, has been described above. Other spectral estimation techniques may also be used to ascertain the frequency components of the frequency response estimates, and hence the tap delays for the impulse response estimates, and this is within the scope of the invention. For example, the spectral estimation may be performed based on a periodogram technique, a Prony estimator, a Pisarenko harmonic decomposition technique, and so on. Each spectral estimation technique typically employs some type of averaging to obtain a good estimate of the frequency component(s) being sought. These various spectral estimation techniques, including the MUSIC technique, are described by S. L. Marple Jr. in "A Tutorial Overview of Modem Spectral Estimation," Proc. IEEE, 1989, pp. 2152-2157, and by B. D. Kao and K. S. Arun in "Model Based Processing of Signals: A State Space Approach," Proc. IEEE, Vol. 80, No. 2, February 1992, pp. 283-309.

Figure 8:
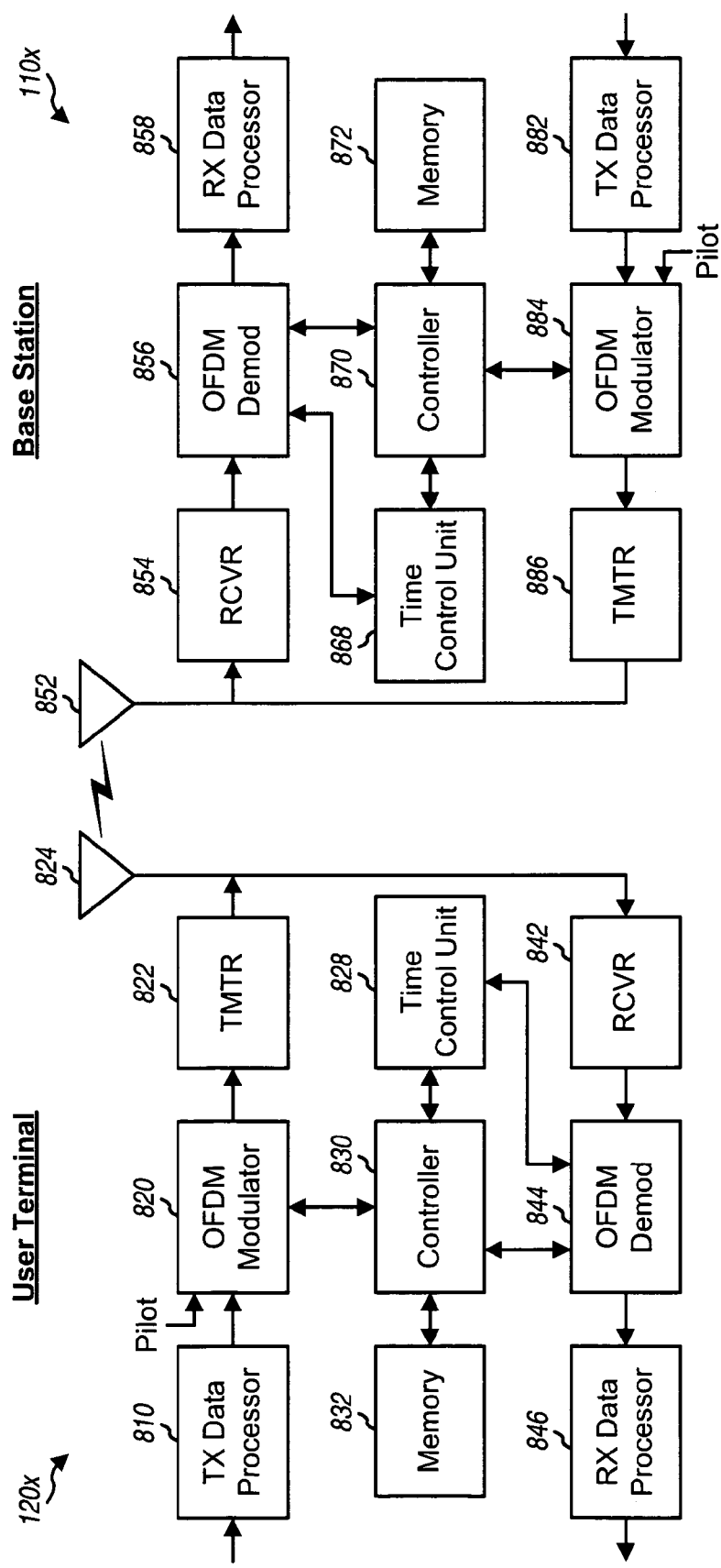
FIG. 8 shows a block diagram of a user terminal and a base station.

FIG. 8 shows a block diagram of user terminal 120*x* and base station 110*x*. On the reverse link, at user terminal 120*x*, a transmit (TX) data processor 810 receives, formats, encodes, interleaves, and symbol maps traffic data and provides modulation symbols (or data symbols). An OFDM modulator 820 receives the data symbols and pilot symbols, performs OFDM modulation, and provides a stream of OFDM symbols. The pilot and data symbols may be transmitted in various manners, e.g., as shown in FIG. 4A. A transmitter unit (TMTR) 822 receives and conditions (e.g., converts to analog, amplifies, filters, and frequency upconverts) the stream of OFDM symbols and generates a reverse link signal, which is transmitted via an antenna 824 to base station 110*x*.

At base station 110*x*, an antenna 852 receives the reverse link signal and provides a received signal to a receiver unit (RCVR) 854. Receiver unit 854 conditions (e.g., filters, amplifies, and frequency downconverts) the received signal, digitizes the conditioned signal, and provides received chips to an OFDM demodulator 856. OFDM demodulator 856 performs OFDM demodulation on the received chips, performs data detection on the received data symbols, and provides detected data symbols, which are estimates of the transmitted data symbols. A receive (RX) data processor 858 symbol demaps, deinterleaves, and decodes the detected data symbols to recover the transmitted data. The processing by OFDM demodulator 856 and RX data processor 858 is complementary to the processing by OFDM modulator 820 and TX data processor 810, respectively, at user terminal 120*x*.

On the forward link, a TX data processor 882 processes traffic data and control data (e.g., for time adjustments) and provides data symbols. An OFDM modulator 884 receives and multiplexes the data symbols with pilot symbols, performs OFDM modulation, and provides a stream of OFDM symbols. The same or different transmission schemes may be used for the forward and reverse links. For example, the transmission scheme shown in FIG. 4A may be used for the reverse link, and the transmission scheme shown in FIG. 4B may be used for the forward link. A transmitter unit 886 receives and processes the stream of OFDM symbols and generates a forward link signal, which is transmitted via an antenna 852 to the user terminals.

At user terminal 120*x*, the forward link signal from base station 110*x* is received by antenna 824 and processed by a receiver unit 842 to obtain received chips. An OFDM demodulator 844 processes the received chips and provides detected data symbols to an RX data processor 846. RX data processor 846 processes the detected data symbols to recover the traffic data transmitted by base station 110*x*.

Controllers 830 and 870 direct the operation at user terminal 120*x* and base station 110*x*, respectively. Memory units 832 and 872 store program codes and data used by controllers 830 and 870, respectively. Time control units 828 and 868 perform time synchronization functions applicable to user terminal 120*x* and base station 110*x*, respectively. Controllers 830 and 870 may also implement time control units 828 and 868, respectively, and may perform time synchronization functions for terminal 120*x* and base station 110*x*, respectively.

Figure 9:
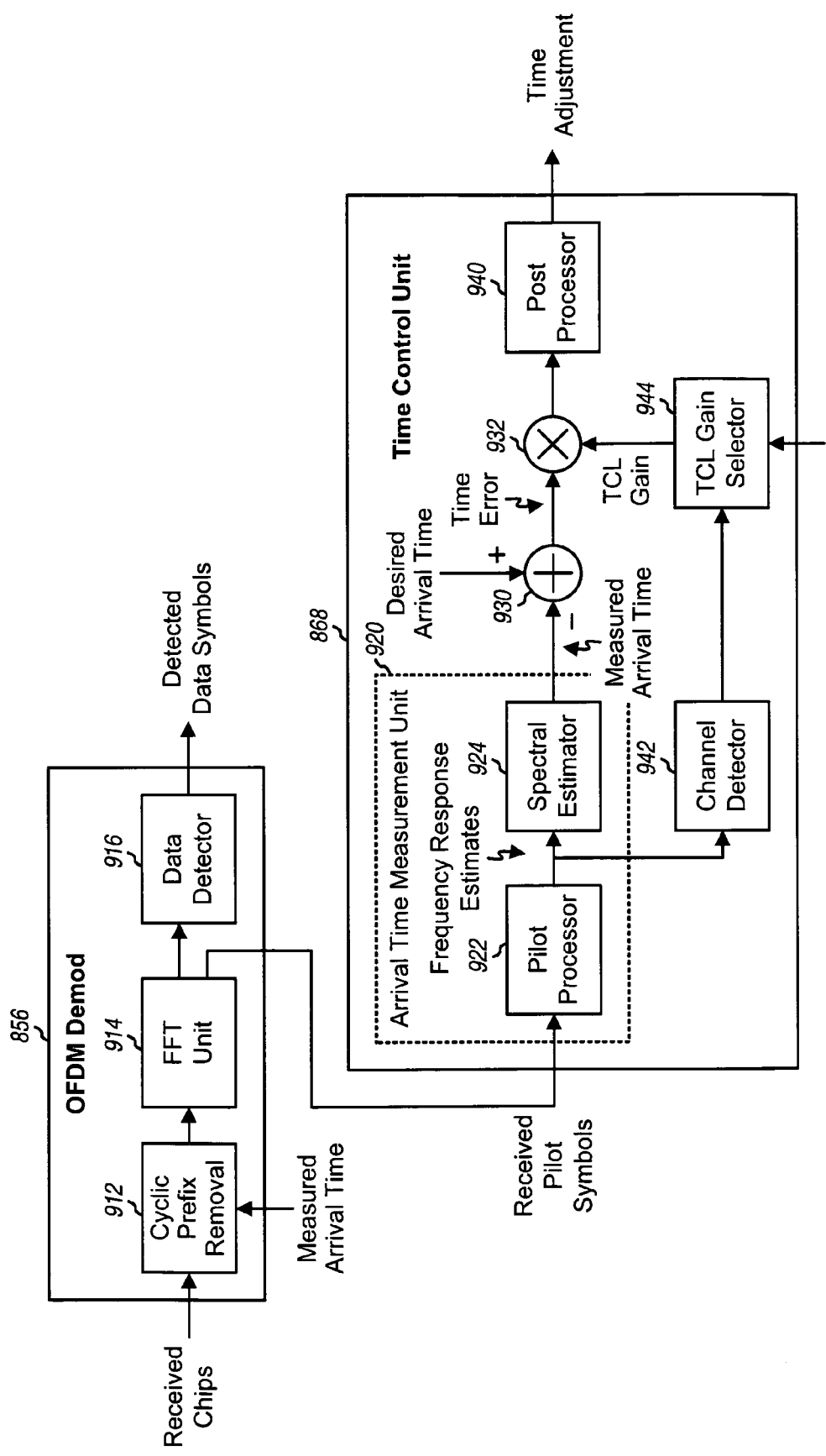
FIG. 9 shows an OFDM demodulator and a time control unit.

FIG. 9 shows an embodiment of OFDM demodulator 856 and time control unit 868 at base station 110*x*. Within OFDM demodulator 856, a cyclic prefix removal unit 912 removes the cyclic prefix appended to each OFDM symbol based on the measured arrival time provided by time control unit 868. An FFT unit 914 then transforms the N received chips for each received transformed symbol to the frequency domain with an N-point FFT and obtains N received symbols for the N subbands. FFT unit 914 provides received pilot symbols to time control unit 868 and received data symbols to a data detector 916. Data detector 916 performs detection (e.g., matched filtering or equalization) on the received data symbols with a frequency response estimate and provides detected data symbols to RX data processor 858.

Time control unit 868 performs receive-side processing for the time control loop for the reverse link from user terminal 120x to base station 110x. An arrival time measurement unit 920 obtains the received pilot symbols and measures the arrival time of the transmissions from user terminal 120x. Within unit 920, a pilot processor 922 removes the modulation on each set of received pilot symbols and provides a frequency response estimate for the reverse link for user terminal 120x. A spectral estimator 924 performs spectral estimation on the frequency response estimates for different sets of pilot symbols (e.g., sent in different hop periods) and provides the measured arrival time for the transmission from user terminal 120x. A summer 930 subtracts the measured arrival time from the desired arrival time and provides the time error. Controller 870 may determine the desired arrival time based on the time scheduled for user terminal 120x. Although not shown in FIG. 9, a lowpass filter may filter the time error and provide and filtered time error. A multiplier 932 multiplies the time error from summer 930 (or the filtered time error from the lowpass filter) with the TCL gain and provides the scaled time error.

A post processor 940 receives the scaled time error and generates the time adjustment for user terminal 120x. Post processor 940 may implement any of the techniques described above such as, for example, saturation, wait-and-confirm, and so on. The time adjustment directs user terminal 120x to advance or delay its timing so that its transmission arrives at the desired arrival time at base station 110x.

A channel detector 942 detects the channel conditions, e.g., the SNR of the transmission received from user terminal 120x, whether the reverse link is static or changing rapidly, and so on. A TCL gain selector 944 receives the detected channel conditions from detector 942, the selected operating mode (e.g., acquisition or tracking mode) for the time control loop from controller 870, and/or other inputs. Gain selector 944 adjusts the TCL gain to achieve the desired performance for the time control loop.

A time control loop for the forward link, if needed, may be implemented in a manner similar to that described above for the reverse link. For this time control loop, user terminal 120x measures the arrival time of a transmission received from base station 110x, e.g., using spectral estimation. The user terminal then generates time adjustment for the forward link based on the measured arrival time and a desired arrival time for the forward link transmission. The base station adjusts its transmit timing for the user terminal so that the forward link transmission arrives at the desired arrival time at the user terminal.

The time synchronization techniques described herein may be implemented by various means. For example, these techniques may be implemented in hardware, software, or a combination thereof. For a hardware implementation, the processing units for time synchronization at a receiver may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units for time synchronization at a transmitter may also be implemented within one or more ASICs, DSPs, and so on.

For a software implementation, the time synchronization techniques may be implemented with modules (e.g., procedures, functions, and so on) that perform the functions described herein. The software codes may be stored in a memory unit (e.g., memory unit 872 in FIG. 8) and executed by a processor (e.g., controller 870). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of performing time synchronization in a communication system, comprising:
   measuring an arrival time of a transmission received via a communication channel using spectral estimation, wherein the measuring the arrival time of the transmission comprises
   obtaining a channel estimate for the communication channel, and
   performing spectral estimation on the channel estimate to obtain the measured arrival time for the transmission;
   determining a time error between the measured arrival time and a desired arrival time for the transmission; and
   generating a time adjustment based on the time error.

2. The method of claim 1, wherein the obtaining the channel estimate for the communication channel comprises
   obtaining a plurality of frequency response estimates for a plurality of sets of frequency subbands, wherein the channel estimate comprises the plurality of frequency response estimates.

3. The method of claim 1, wherein the performing spectral estimation on the channel estimate comprises
   determining a dominant frequency component in the channel estimate, and deriving the measured arrival time based on the dominant frequency component.

4. The method of claim 1, further comprising:
   scaling the time error with a gain, and wherein the time adjustment is generated based on the scaled time error.

5. The method of claim 4, further comprising:
   adjusting the gain based on at least one condition of the communication channel.

6. The method of claim 4, further comprising:
   adjusting the gain based on an operating mode selected from among a plurality of operating modes comprising an acquisition mode and a tracking mode.

7. The method of claim 4, further comprising:
   determining a rate of shift in a channel profile obtained from the spectral estimation; and
   adjusting the gain based on the rate of shift in the channel profile.

8. The method of claim 1, wherein the generating the time adjustment based on the time error comprises
filtering the time error, and
deriving the time adjustment based on the filtered time error.

9. The method of claim 1, further comprising:
limiting the time adjustment to be within a predetermined range of values.

10. The method of claim 1, wherein the generating the time adjustment based on the time error comprises
determining magnitude of the time error,
generating the time adjustment based on a first function if the magnitude of the time error is within a predetermined range, and
generating the time adjustment based on a second function if the magnitude of the time error is outside of the predetermined range.

11. An apparatus operative to perform time synchronization in a communication system, comprising:
a measurement unit operative to measure an arrival time of a transmission received via a communication channel using spectral estimation, wherein the measuring the arrival time of the transmission comprises
obtaining a channel estimate for the communication channel, and
performing spectral estimation on the channel estimate to obtain the measured arrival time for the transmission;
a summer operative to provide a time error between the measured arrival time and a desired arrival time for the transmission; and
a post processor operative to generate a time adjustment based on the time error.

12. The apparatus of claim 11, wherein the measurement unit comprises
a pilot processor operative to receive a pilot sent via the communication channel and to derive a channel estimate for the communication channel, and
a spectral estimator operative to perform spectral estimation on the channel estimate to obtain the measured arrival time for the transmission.

13. The apparatus of claim 12, wherein the pilot processor is operative to derive a plurality of frequency response estimates for a plurality of sets of frequency subbands, and wherein the channel estimate comprises the plurality of frequency response estimates.

14. The apparatus of claim 13, wherein the pilot processor is operative to receive pilot symbols on each of the plurality of sets of frequency subbands and to derive the frequency response estimate for each set of frequency subbands based on the received pilot symbols for the set of frequency subbands.

15. The apparatus of claim 13, wherein each set of subbands includes a subset of N total subbands in the system, where N is an integer greater than 1.

16. The apparatus of claim 13, wherein each set of subbands includes M consecutive subbands in the system, where M is an integer greater than 1.

17. The apparatus of claim 13, wherein each set of subbands includes M subbands uniformly distributed across N total subbands in the system, where M and N are integers greater than one, and M is less than N.

18. The apparatus of claim 13, wherein the plurality of sets of subbands are determined by a pseudo-random sequence used for frequency hopping.

19. The apparatus of claim 12, wherein the pilot processor is operative to receive a wideband pilot sent via the communication channel and to derive the channel estimate based on the wideband pilot.

20. The apparatus of claim 12, wherein the spectral estimator is operative to determine a dominant frequency component in the channel estimate and to derive the measured arrival time based on the dominant frequency component.

21. The apparatus of claim 12, wherein the spectral estimator is operative to perform spectral estimation on the channel estimate using a multiple signal classification (MUSIC) technique, a periodogram technique, a Prony estimator, or a Pisareniko harmonic decomposition technique.

22. The apparatus of claim 11, further comprising:
a multiplier operative to scale the time error with a gain, and wherein the post processor is operative to generate the time adjustment based on the scaled time error.

23. The apparatus of claim 22, wherein the gain is adjusted based on at least one condition of the communication channel.

24. The apparatus of claim 22, wherein the gain is adjusted based on a signal-to-noise ratio (SNR) of the transmission.

25. The apparatus of claim 22, further comprising:
a controller operative to select an operating mode from among a plurality of operating modes and to adjust the gain based on the selected operating mode.

26. The apparatus of claim 11, further comprising:
a filter operative to filter the time error.

27. The apparatus of claim 11, wherein the post processor is operative to limit the time adjustment to be within a predetermined range of values.

28. The apparatus of claim 11, wherein the post processor is operative to determine magnitude of the time error, to generate the time adjustment based on a first function if the magnitude of the time error is within a predetermined range, and to generate the time adjustment based on a second function if the magnitude of the time error is outside of the predetermined range.

29. The apparatus of claim 11, wherein the post processor is operative to generate the time adjustment based on the time error and in accordance with a first order loop for the time synchronization.

30. The apparatus of claim 11, wherein the post processor is operative to generate the time adjustment based on the time error and in accordance with a second order loop for the time synchronization.

31. The apparatus of claim 11, wherein the communication system utilizes orthogonal frequency division multiplexing (OFDM).

32. The apparatus of claim 11, wherein the communication system is an orthogonal frequency division multiple access (OFDMA) system.

33. An apparatus operable to perform time synchronization in a communication system, comprising:
means for measuring an arrival time of a transmission received via a communication channel using spectral estimation, wherein the measuring the arrival time of the transmission comprises
obtaining a channel estimate for the communication channel, and
performing spectral estimation on the channel estimate to obtain the measured arrival time for the transmission;
means for determining a time error between the measured arrival time and a desired arrival time for the transmission; and means for generating a time adjustment based on the time error.

34. The apparatus of claim 33, wherein the means for measuring the arrival time of the transmission comprises
means for obtaining a channel estimate for the communication channel, and means for performing spectral estimation on the channel estimate to obtain the measured arrival time for the transmission.

35. The apparatus of claim 34, wherein the means for obtaining the channel estimate for the communication channel comprises
means for obtaining a plurality of frequency response estimates for a plurality of sets of frequency subbands, wherein the channel estimate comprises the plurality of frequency response estimates.

36. The apparatus of claim 34, wherein the means for performing spectral estimation on the channel estimate comprises
means for determining a dominant frequency component in the channel estimate, and
means for deriving the measured arrival time based on the dominant frequency component.

37. The apparatus of claim 33, further comprising:
means for scaling the time error with a gain, and wherein the time adjustment is generated based on the scaled time error.

38. The apparatus of claim 33, further comprising:
means for limiting the time adjustment to be within a predetermined range of values.

39. A method of measuring arrival time in a communication system, comprising:
obtaining a channel estimate for a communication channel;
performing spectral estimation on the channel estimate to determine a dominant frequency component in the channel estimate; and
deriving a measured arrival time based on the dominant frequency component.

40. The method of claim 39, wherein the obtaining the channel estimate for the communication channel comprises
obtaining a plurality of frequency response estimates for a plurality of sets of frequency subbands, and wherein the channel estimate comprises the plurality of frequency response estimates.

41. An apparatus operative to measure arrival time in a communication system, comprising:
means for obtaining a channel estimate for a communication channel;
means for performing spectral estimation on the channel estimate to determine a dominant frequency component in the channel estimate; and
means for deriving a measured arrival time based on the dominant frequency component.

42. A computer program product comprising:
a computer readable medium for performing time synchronization in a communication system, comprising:
instructions for measuring an arrival time of a transmission received via a communication channel using spectral estimation, wherein the measuring the arrival time of the transmission comprises
obtaining a channel estimate for the communication channel, and
performing spectral estimation on the channel estimate to obtain the measured arrival time for the transmission;
instructions for determining a time error between the measured arrival time and a desired arrival time for the transmission; and
instructions for generating a time adjustment based on the time error.

43. The computer program product of claim 42, wherein the computer readable medium further comprises:
instructions for scaling the time error with a gain, and wherein the time adjustment is generated based on the scaled time error.

44. The computer program product of claim 43, wherein the computer readable medium further comprises:
instructions for adjusting the gain based on at least one condition of the communication channel.

45. The computer program product of claim 43, wherein the computer readable medium further comprises:
instructions for adjusting the gain based on an operating mode selected from among a plurality of operating modes comprising an acquisition mode and a tracking mode.

46. The computer program product of claim 43, wherein the computer readable medium further comprises:
instructions for determining a rate of shift in a channel profile obtained from the spectral estimation; and
instructions for adjusting the gain based on the rate of shift in the channel profile.

47. The computer program product of claim 43, wherein the computer readable medium further comprises:
instructions for limiting the time adjustment to be within a predetermined range of values.

48. A processor for performing time synchronization in a communication system, the processor comprising:
means for measuring an arrival time of a transmission received via a communication channel using spectral estimation, wherein the measuring the arrival time of the transmission comprises
obtaining a channel estimate for the communication channel, and
performing spectral estimation on the channel estimate to obtain the measured arrival time for the transmission;
means for determining a time error between the measured arrival time and a desired arrival time for the transmission; and
means for generating a time adjustment based on the time error.

49. The processor of claim 48, further comprising:
means for scaling the time error with a gain, and wherein the time adjustment is generated based on the scaled time error.

50. The processor of claim 49, further comprising:
means for adjusting the gain based on at least one condition of the communication channel.

51. The processor of claim 49, further comprising:
means for adjusting the gain based on an operating mode selected from among a plurality of operating modes comprising an acquisition mode and a tracking mode.

52. The processor of claim 49, further comprising:
means for determining a rate of shift in a channel profile obtained from the spectral estimation; and
means for adjusting the gain based on the rate of shift in the channel profile.

53. The processor of claim 49, further comprising:
means for limiting the time adjustment to be within a predetermined range of values.

* * * * *